United States Patent [19]
Demler, Sr.

[11] 3,877,735
[45] Apr. 15, 1975

[54] METHOD AND DEVICE FOR JOINING PLASTIC PIPE

[75] Inventor: Henry William Demler, Sr., Lebanon, Pa.

[73] Assignee: AMP Incorporated, Harrisburg, Pa.

[22] Filed: Apr. 16, 1973

[21] Appl. No.: 351,742

[52] U.S. Cl............................ 285/382.1; 285/382.7
[51] Int. Cl............................................... F16l 13/14
[58] Field of Search............. 285/382, 382.1, 382.7, 285/40, 202, 214, 222, 256

[56] References Cited
UNITED STATES PATENTS

| | | | |
|---|---|---|---|
| 943,815 | 12/1909 | Craven............................ | 285/382.1 |
| 1,281,498 | 10/1918 | Brevig............................ | 285/382.1 |
| 2,613,958 | 10/1952 | Richardson...................... | 285/382.7 |
| 3,343,248 | 9/1967 | Silverman et al................ | 285/382.7 |

*Primary Examiner*—Patrick D. Lawson
*Attorney, Agent, or Firm*—AMP Incorporated

[57] ABSTRACT

This invention relates to a method and device with which two ends of a plastic pipe may be joined. More particularly, the invention includes insert members with flanges on one end, clips which clip onto the flanges thereby retaining the inserts in abutting relation, a resilient deformable sleeve or coupling member having external serrations and which bridges the ends of the pipe being joined and lastly means to transfer the external serrations on the coupling to the inside of the pipe where such interlock with serrations on the insert member.

6 Claims, 4 Drawing Figures

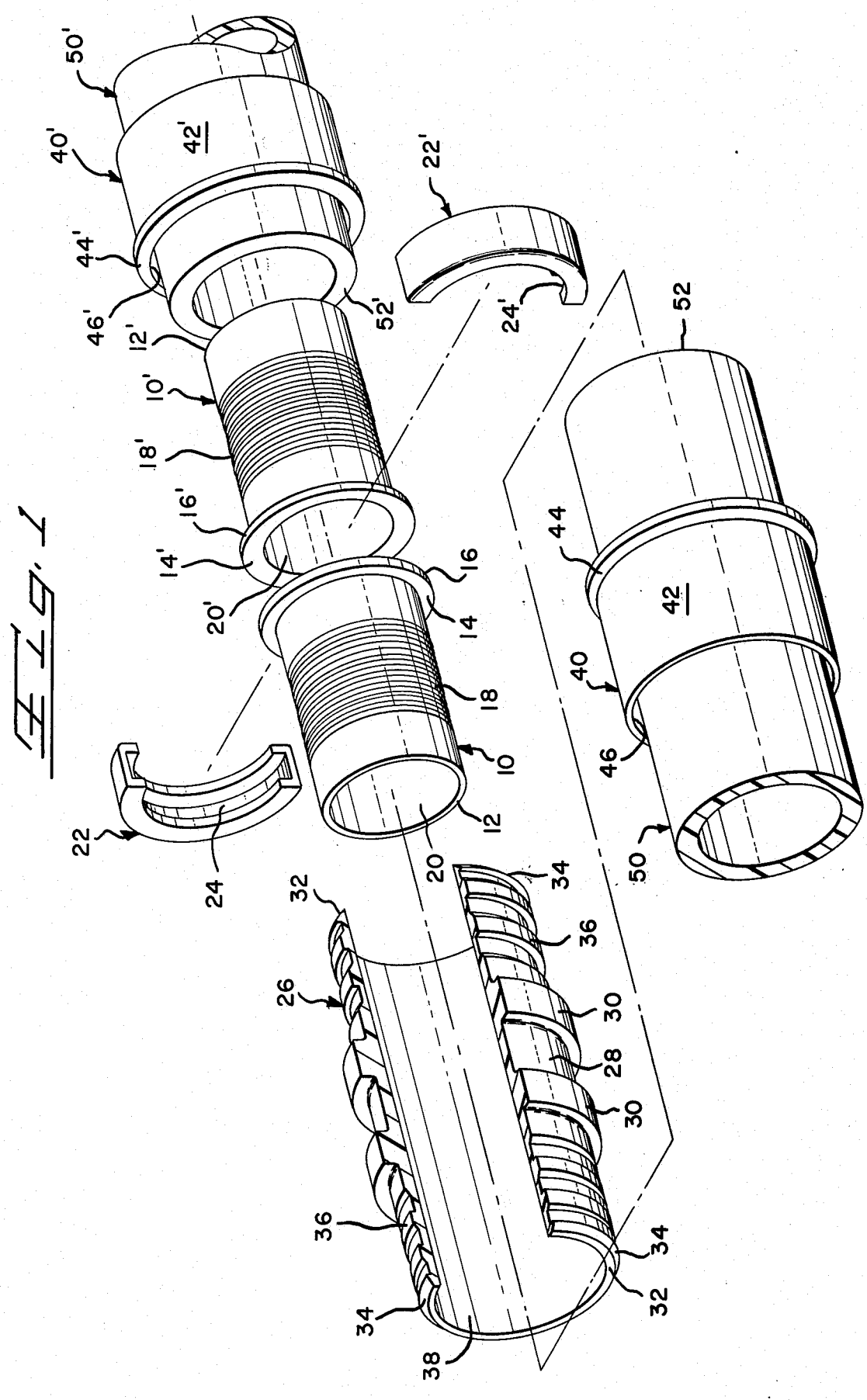

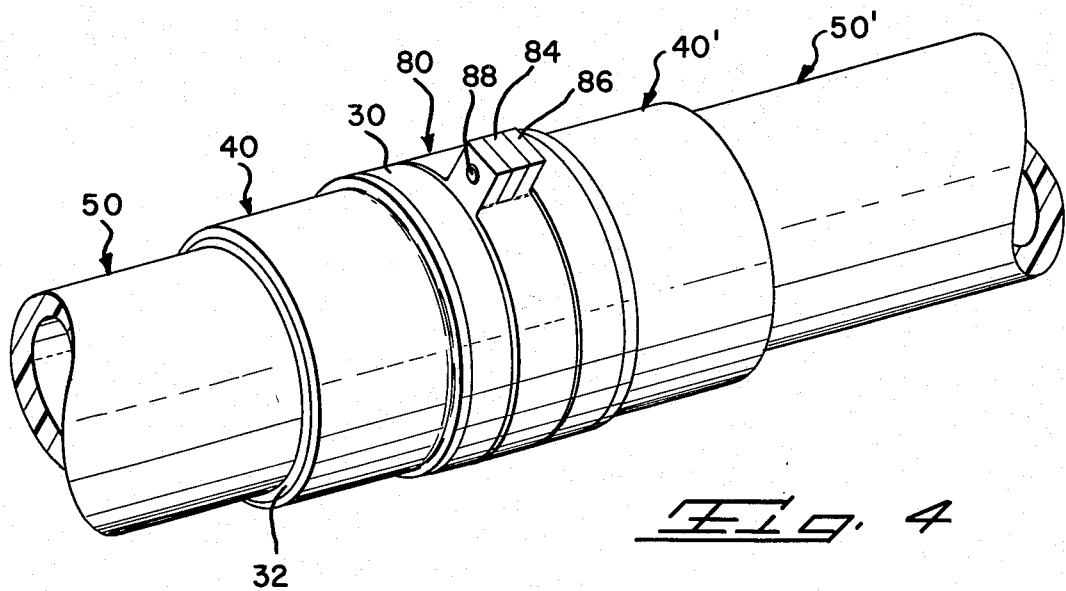
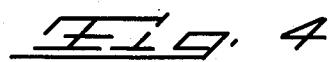
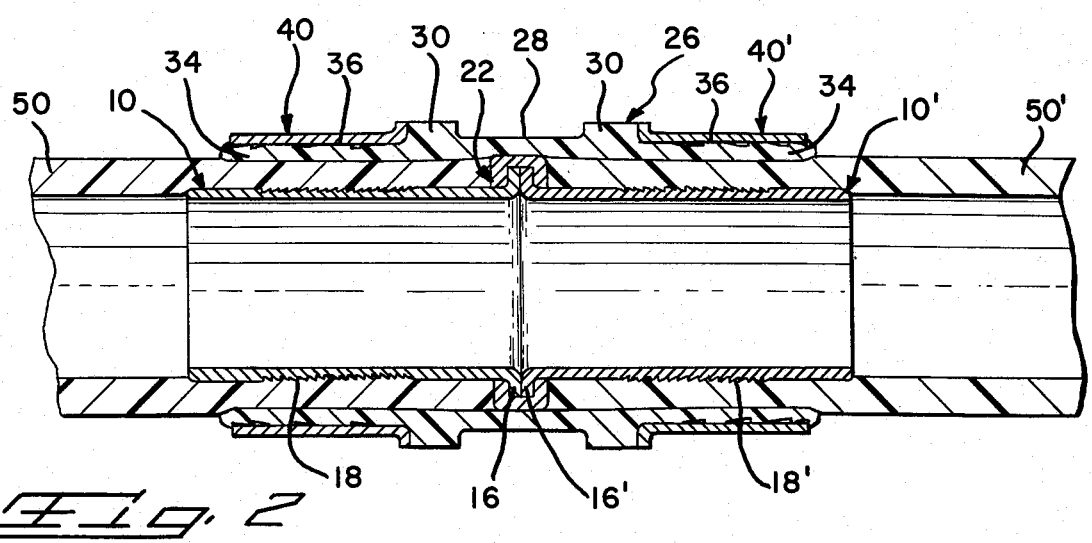
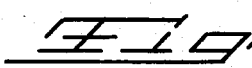
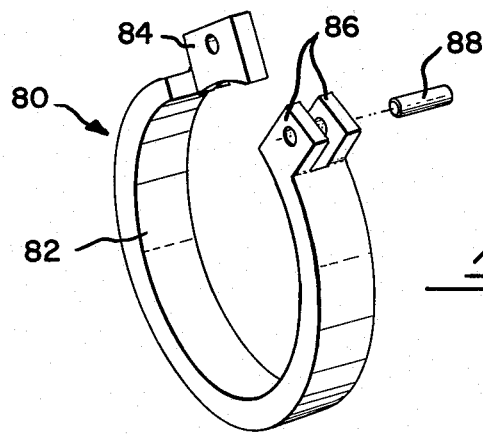
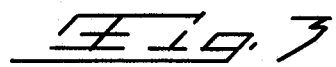

METHOD AND DEVICE FOR JOINING PLASTIC PIPE

BACKGROUND OF THE INVENTION

Buried plastic pipe is often accidently severed by earth digging equipment. Further, it is often intentionally severed by utility crews to provide access to lower-lying pipe or to lay pipe at a greater depth than the plastic pipe. Whatever the reason for such severance, the plastic pipe requires repairing and generally as soon as possible. As is well known to those experienced in this field, buried pipe cannot be readily moved longitudinally if at all. Provided some earth on one or both sides of the pipe is removed some limited lateral movement is possible.

The present method of repairing buried plastic pipe requires that several feet of pipe be cut out and a flanged fitting fixed to each end by fusion or solvent welding or by use of a mechanical fitting having inserts. A section of steel pipe having a corresponding flanged fitting on each end is dropped into place between the ends of the plastic pipe and the fittings bolted together. In most cases there must be some longitudinal movement of the plastic pipe to adjust for errors in cutting, different size flanges and the like. Further, the present method requires considerable excavation and in most soils cathodic protection for the metal flanges, inserts and the replacement pipe section. Obviously this method is time consuming and requires skilled workmen to effect a repair.

Accordingly, the present invention provides a coupling device useful for joining the ends of two plastic pipes which comprises a pair of rigid inserts for sliding into the end of the pipes; these inserts being tubular and having a flange on one end and serrations along the tubular section; a pair of half-moon clips which are adapted to be slipped over the flanges when they are in abutting engagement to secure them together, an elongated coupling member having serrations thereon and which is adapted to be slid over the clip-held flanges and which extends along the pipe in both directions therefrom, and a pair of rigid rings which are forced over each end of the coupling member and by so doing secure the coupling member to the enclosed length of pipes by means of reforming the serrations from the coupling member to the inside of the plastic pipe and into interlocking engagement with the serrations on the inserts.

BRIEF DESCRIPTION OF THE DRAWINGS

FIG. 1 is an exploded, partially sectional, perspective view of the present invention;

FIG. 2 is a cross-section view of FIG. 1 after the union has been completed;

FIG. 3 shows a collar useful in the present invention; and

FIG. 4 shows a completed union of FIG. 2 utilizing the collar of FIG. 3.

DESCRIPTION OF THE PREFERRED EMBODIMENT

The coupling device constructed in accordance with the present invention consists of a pair of tubular insert members, a pair of half-moon retaining clips, one deformable coupling member and a pair of rigid rings. As each of the elements constituting a pair are identical one to the other, one reference numeral assigned to each feature on one element will apply to the same feature on the other element; to distinguish one element from the other, the reference numerals on one will include a "prime" mark.

Referring now to FIG. 1, specific features of each of the elements will be pointed out.

The tubular insert members 10 have an unencumbered "lead-in" end 12 and a flanged "abutting" end 14. The annular flange 16 projects outwardly a predetermined distance. Intermediate the two ends is a serrated section 18 such section consisting of a plurality of individual serrations. Insert members 10 must be reasonably rigid under applied external forces and for this reason, the diameter of passageway 20 therein may be maximumized but only to the extent consistent with this limitation. The outer diameter of the inserts are predetermined so that they fit snugly into the ends of the pipes being joined.

The half-moon or semi-circular retaining clips 22 have a predetermined thickness and width. While the outside surfaces of the clips are preferably smooth the inside surfaces contain grooves 24. The preferred depth of these grooves are substantially equal to the distance flanges 16 project. Both tubular inserts 10 and retaining clips 22 are preferably made from a non-deformable material such as steel.

The only single; i.e., non paired element, in the present invention is coupling member 26. However, it is not without symmetry as one half thereof is the mirror image of the other. A center section 28, defined by two spaced apart annular ribs 30, bisect the member. On each end 32 there is an annular retaining rim 34. This rim, which projects outwardly, is beveled on the side facing away from the center section 28. The side facing the center section is perpendicular to the longitudinal axis of the member. Intermediate rib 30 and rim 34 on each half are two serrations 36, which, like rims 34 have one beveled side and one perpendicular side. As seen in FIG. 1, the tops of serrations may be flat and preferably should be of some width. The position of the serrations on coupling member 26 must be in or close to alignment wtih serrations 18 on inserts 10 when the coupling device is assembled. The purpose of beveling one side is simply to facilitate assembly of the coupling device and is not critical per se to the invention. The passageway 38 defined by coupling member 26 is larger than the outer diameter of the retaining clips 22 when clipped onto flanges 16 but only to the extent necessary to allow the member to slide over the clips. Coupling member 26 is made from deformable plastic and preferably has some transparency.

The rigid rings 40 consist of a tubular section 42 which is terminated at one end by outwardly projecting flange 44. The distance that the flanges project is preferably substantially equal to the distance ribs 30 project. Passageways 46 in rings 40 have smooth walls and a diameter that is undersized with respect to the outer diameter of coupling member 26 as measured at rims 34-serrations 36. Rings 40 may be made from steel or other non-deformable material.

Pipes 50, seen positioned in passageway 46 in rigid rings 40 in FIG. 1 are of plastic or other deformable material. The only preparation of such pipe required is that the ends 52 be squared off.

UTILIZATION OF THE PREFERRED EMBODIMENT

FIG. 1 shows in exploded fashion the elements of the coupling device constructed in accordance with the present invention. As is apparent, the elements have been exploded in the manner in which the device is assembled. FIG. 3 to which reference is now made shows in cross-section the assembled coupling device securely holding pipes 50–50' together.

The first step is to laterally move each pipe 50 so that ends 52 are displaced one from the other and are unobstructed by the other. Then rigid rings 40–40' are slid onto pipes 50–50'. The next step is to slide coupling member 26 onto either pipe 50 or 50'. While the above step can be deferred, it is more logical to group like steps so as to simplify assembly.

Inserts 10–10' are now inserted into open ends 52–52' of pipes 50–52 at least far enough so that the pipes cover serrations 18–18'.

With the tubular inserts in the pipes, the pipes are brought back into axial alignment so that flanges 16–16' abut each other. This may require longitudinal movement of the inserts but not of the pipes. Retaining clips 22–22' are then slipped on over the flanges; the flanges being received in grooves 24–24'. As the diameter of the grooves are substantially equal to the diameter of the flanges, the clips hold the inserts together firmly. As noted above, the diameter of clips 22–22' is predetermined so that the outside diameter coincides with the outside diameter of pipes 50–50'.

Coupling member 26 may now be slid over the aforementioned union so that the mid point of center section 28 essentially overlies retaining clips 22–22'. If the member is transparent the positioning is obviously simplified. With the coupling member so positioned, serrations 36 thereon are in registration with serrations 18–18' on inserts 10–10'.

The final step in the assembly of the coupling device is to force rigid rings 40–40' onto either half of coupling member 26 by means of a hand operated, plier-like tool which are found in most gas company repair trucks. As FIG. 3 shows, the rings are squeezed onto the member until flanges 44–44' abut ribs 30. As the diameter of passageways 46–46' is less than the diameter of serrations 36, these serrations flow inwardly. The deformation of the serrations is carried through the walls of pipes 50–50' so that the inside of the walls are extruded into interlocking relationship with serrations 18–18' on inserts 10–10'. As the rings are squeezed beyond rims 34 the rims spring back to their original position locking rings inbetween ribs 30 and rims 34.

In addition to securely joining the two ends of pipes 50–50' together, the nature of the coupling device also provides a fluid seal to prevent leakage from either end. This sealing is accomplished by the squeezing of pipes 50–50' and coupling member 26 between rigid inserts 10–10' and rigid ring 40–40'.

Although two pipes may be securely and sealingly joined together by the coupling device described above and illustrated in FIGS. 1 and 2, reinforcing of the joint may be provided by the addition of a reinforcing band 80 shown in FIGS. 3 and 4. Band 80, which may be made from polyethylene, consists of a split collar 82 having a width slightly less than the width of center section 28 on coupling member 26. Collar 82 is placed around the assembled coupling device seen in FIG. 2 in the aforementioned center section 28 and radially squeezed until the hole in the single tab 84 is in registration with the holes in the double tabs 86. Pin 88 is slipped into the aligned holes locking the band onto the assembled coupling device in the manner shown in FIG. 4.

The foregoing detailed description has been given for clearness of understanding only, and no unnecessary limitations should be understood therefrom, as some modifications will be obvious to those skilled in the art.

What is claimed is:

1. A coupling device useful for joining two plastic pipes arranged end to end, comprising:
    a. insert means for snug insertion into the ends of said plastic pipes, said means each having a flange on one end thereof;
    b. retaining means adapted to grip and retain said flanges in abutting relation with each other whereby said plastic pipes are joined one to the other;
    c. cylindrical coupling means for positioning about the joined plastic pipes and axially spanning the ends thereof, said coupling means being in overlying relation to the insert means; and
    d. a pair of rings having a smaller inner diameter than the outer diameter of the cylindrical coupling means, said rings adapted for being fitted around the coupling means thereby pressing and retaining the plastic pipes between the coupling means and the insert means.

2. A coupling device useful for joining two plastic pipes arranged end to end, comprising:
    a. insert means for snug insertion into the end of the plastic pipes, said means each having a flange on one end thereof;
    b. retaining means adapted to grip and retain the flanges in abutting relation with each other whereby said plastic pipes are joined one to the other;
    c. a deformable cylindrical coupling means having serrations thereon; and
    d. a pair of rigid rings having a smaller inner diameter than the outer diameter of said serrations on said coupling means, said rings adapted to be placed around said coupling means in registration with the serrations thereby compressing the serrations so that the structure thereof is transferred to the inside of the plastic pipes.

3. The coupling device of claim 2 further comprising grooves on said insert means which are adapted to receive reformed serrations transferred from said serrations on said coupling means to said inside of said plastic pipes.

4. A coupling device useful for joining two plastic pipes arranged end to end, comprising:
    a. a pair of tubular insert members each having attaching means on one end, said members adapted to be inserted into an end of said plastic pipe so that said attaching means protrude therefrom and abut the other attaching means;
    b. retaining means adapted to be attached to said abutting attaching means on said insert members whereby said pipe-surrounding insert members are retained in abutting relation;
    c. coupling means for telescopingly receiving said retained pipe-surrounding insert members, said pipe being between said coupling means and said insert members; and d. a pair of rigid rings, each slidingly received onto either end of said coupling member so that said coupling means is radially compressed thereby pressing said plastic pipes into sealing engagement between said coupling means and said insert members.

5. A coupling device useful for joining two plastic pipe arranged end to end, comprising:
   a. a pair of tubular insert members each having a lead-in end and a laterally projecting flange on another end and a plurality of toothed serrations on the outer surface thereof between said ends, said insert members being adapted for being received into said ends of said pipes with said flanged ends protruding therefrom in abutting relation;
   b. a pair of semi-circular retaining clips each having an interior groove, each of said clips being adapted to slip over a portion of said abutting flanges with said flanges being received in said grooves, said clips thereby retaining said insert members in abutting relation;
   c. an elongated coupling member having two annular ribs spaced apart by a center section, an annular retaining rim on each end and a plurality of serrations between said ribs and said rims, said coupling member adapted to be placed in encircling relation over said clip-retained insert members and said pipe ends whereby said center section is in registration with said retaining clips, and said serrations are in registration with said serrations on said insert members; and
   d. a pair of rigid rings each having an annular flange on one end, and a passageway therethrough, said passageway being smaller in diameter than said serrations on said coupling member, said rings being adapted to be slid on either end of said coupling member whereby said flanges on said rings abutts said ribs and each of said serrations are resiliently compressibly reformed on the interior surfaces of plastic pipe and are forcibly interlocked with said serrations on said insert members whereby the said pipes are coupled and said rims retain said rings on said coupling member.

6. A coupling device useful for joining two plastic pipes arranged end to end, comprising:
   a. a pair of tubular insert members having a laterally projecting flange on one end said insert members being adapted for being received into the ends of said pipes with said flanged ends protruding therefrom in abutting relation;
   b. a pair of semi-circular retaining clips each having an interior groove, said clips being adapted to slip over said abutting flanges with said flanges being received in said grooves, said clips thereby retaining said insert members in abutting relation;
   c. an elongated coupling member having a center section and a plurality of serrations between said center section and the ends thereof, said coupling member adapted to be placed in encircling relation over said clip-retained insert members and said pipe ends; and
   d. a pair of rigid rings having a passageway therethrough, said passageway being smaller in diameter than said serrations on said coupling member, said rings being adapted to be slid on either end of said coupling member whereby each of said serrations are resiliently compressibly reformed on the interior surfaces of plastic pipe in forced engagement with said insert members whereby said pipes are coupled.

* * * * *